United States Patent [19]
Geppert et al.

[11] 3,874,889
[45] Apr. 1, 1975

[54] FIRE RETARDANT COMPOSITION

[75] Inventors: Gerard A. Geppert, Belleville; Robert Dale Woosley, Collinsville, both of Ill.

[73] Assignee: Aluminum Company of America, Pittsburgh, Pa.

[22] Filed: June 13, 1973

[21] Appl. No.: 369,436

[52] U.S. Cl. ...... 106/288 B, 106/15 FP, 106/308 B, 260/2.5 FP, 117/137, 423/625
[51] Int. Cl. .............................. C09c 1/40
[58] Field of Search ............ 106/288 B, 309, 308 B, 106/15 FP; 260/2.5 FP; 117/137, 138; 423/625

[56] References Cited
UNITED STATES PATENTS

| | | | |
|---|---|---|---|
| 2,642,337 | 6/1953 | Newsome | 423/625 |
| 3,653,937 | 4/1972 | Koenig et al. | 106/288 B |
| 3,699,041 | 10/1972 | Sanderford et al. | 106/308 N |

Primary Examiner—Winston A. Douglas
Assistant Examiner—J. V. Howard
Attorney, Agent, or Firm—John P. Taylor

[57] ABSTRACT

A fire-retardant foamable latex carpet backing can be produced using large particles of alpha alumina-trihydrate which have been ground to a median particle size of about 6–35 microns and subsequently treated with sufficient water at a sufficient temperature and for a sufficient time to prevent collapse of the subsequent fire-retardant foam latex.

7 Claims, 2 Drawing Figures

FIRE RETARDANT COMPOSITION

BACKGROUND OF THE INVENTION

This invention relates to fire-retardant compositions and more particularly, to a ground alumina-trihydrate fire-retardant material which is treated to render it compatible with other ingredients of the fire-retardant composition.

In recent years, the large and ever-increasing use of both natural and synthetic organic materials has created a need for compatible flame-retardant inorganic filler materials to reduce the fire hazard concomitant with the use of organic materials. Hydrated alumina of the form $Al_2O_3 \cdot 3H_2O$ (alpha alumina trihydrate) has been found to be a very effective fire-retardant and has recently been widely used in the formulation of carpet backing compositions to provide the degree of fire-retardancy in carpeting required by governmental regulations. The hydrated alumina is used as a filler in the rubber latices used as binders to hold the rug fibers to the fibrous backing. Upon exposure to heat such as from a fire, the alumina dehydrates, thus absorbing large quantities of heat as well as liberating water. Since the dehydration effect apparently imparts the the desired fire-retardant characteristics, the use of the trihydrated form is naturally preferred.

This form of alumina is readily available as a by-product in the production of aluminum metal from aluminum bearing ores such as bauxite. However, since the alumina is produced principally for subsequent consumption in a Hall-type cell to produce aluminum metal, it is often produced in coarse particle form for ease of processing.

Such coarse particles (for example, about 75% + 200 mesh or 74 microns) cannot be easily suspended in the latex compositions used, but rather, tend to settle out. Grinding of the trihydrated alumina to a median particle size of about 6–35 microns with less than about 5% + 200 mesh has been found to solve this problem.

However, quite surprisingly, and somewhat unexplainably, the ground alumina, when used in certain latex compositions used to produce a foamed latex backing (for carpeting having an integrally formed padding bonded thereto) causes the foam to collapse.

SUMMARY OF THE INVENTION

It is, therefore, an object of this invention to render coarse particles of alumina trihydrate compatible with foamable latex materials.

It is another object of this invention to provide a fire-retardant foamable latex carpet backing composition using alumina trihydrate.

These and other objects of the invention will become apparent from the description of the invention.

In accordance with the invention, coarse alumina-trihydrate particles are rendered compatible with foamable latex materials by first grinding the coarse particles to fine particles having a median particle size of about 6–35 microns and then treating the surfaces of the ground particles with either liquid water or water vapor at a temperature of from about 20°C to 100°C, and preferably as water vapor at about 100°C for a sufficient period of time to achieve a moisture content of at least about 0.25 and less than 1 percent.

DESCRIPTION OF THE PREFERRED EMBODIMENTS

Figure 1:
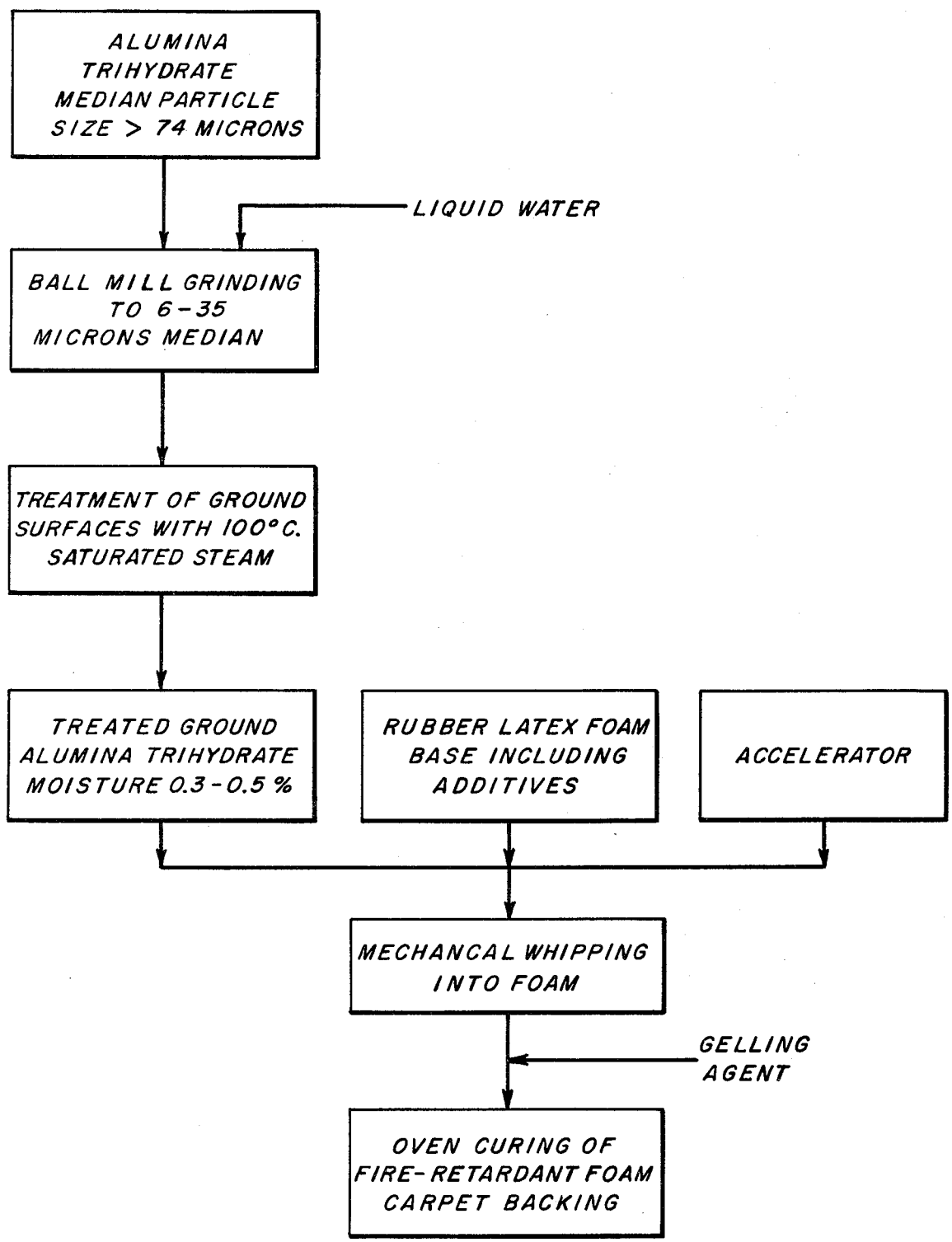
FIG. 1 is a flow sheet.
Figure 2:
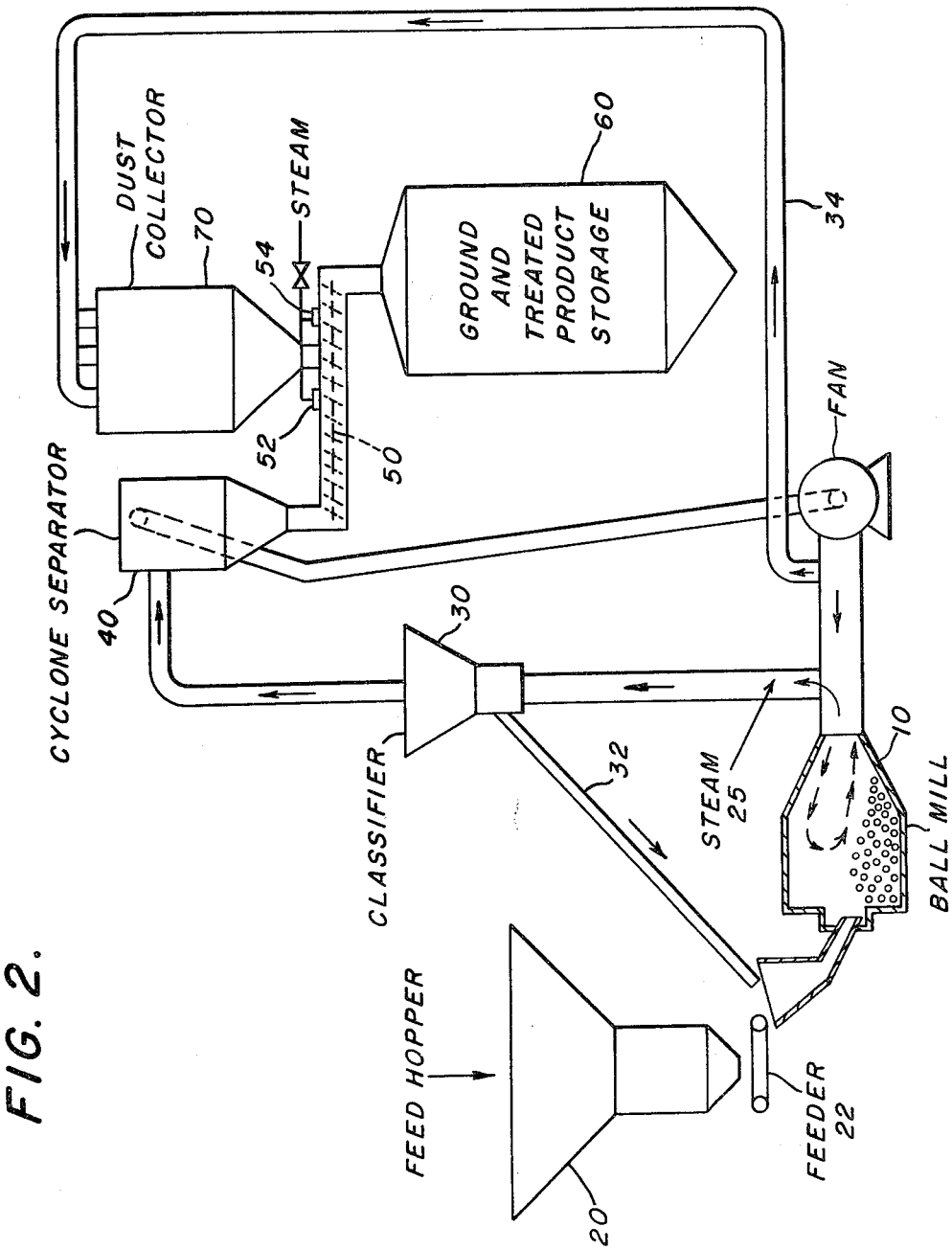
FIG. 2 is a diagrammatical illustration showing a preferred point of contact between the ground alumina and liquid water and water vapor.

In accordance with the invention, fire-retardant carpet backing is produced using coarse hydrated alumina which is ground and then treated to render it compatible with foamable latexes. As shown in FIG. 2, the coarse alumina particles are conveniently ground in a ball mill 10 to which they are fed from a hopper 20 on a belt feeder 22. Air is circulated over the ball mill to remove the ground particles as shown in the Figure. Steam can be injected into the air stream at 25. The air stream moves through a classifier 30 which returns the oversized particles back to the ball mill via a return 32. The particles of the proper size, that is, having a median particle size range of about 6 to 35 microns are then carried up to a cyclone 40 where they are separated from the air stream and are fed via a product screw feed 50 to storage tank 60. Undersized particles, i.e., dust, are collected at port 34 and introduced into the final product through a dust collector 70 which feeds the very fine particles into the product screw for dispersal with the larger size particles.

In accordance with a preferred embodiment of the invention, the ground particles are treated to render them compatible with foamable latices by contacting the surfaces of the ground particles with water in the product screw 50 by the introduction of saturated steam at about 100°C through two spaced ports 52 and 54 along the barrel of the product screw. The residence time of the particles will depend on the screw pitch, diameter, and speed of the equipment in the screw conveyor. It has been found, however, that a contact time between the steam and the ground hydrate of from about 0.1 to 5.0 minutes will result in the desired amount of moisture. The resultant ground and treated particles have a moisture content of at least about 0.25 percent and less than 1 percent; and preferably between 0.25 and 0.5 percent by weight. The steam is controlled to maintain the moisture content within the preferable range.

The ground alumina may also be treated by dampening the ground particles with water, for example to a moisture content of about 7 to 11 percent followed by drying for several hours at 105°C. Alternatively, the material after dampening with water, may be stored in a sealed container and allowed to age for several days at room temperature. Although this treatment renders the ground hydrate compatible in a latex foam, the dampening in this moisture range tends to cause the ground hydrate to agglomerate or cake and the agglomerates remain as friable lumps even after drying. The control of the total amount of water used is therefore very important because the formation of such agglomerates cause transport and handling problems. It is also necessary that a freely flowing comminuted product be available for blending with the latex. This is not possible if large quantities of water have been previously introduced into the alumina.

Thus, while certain water temperature ranges are recited which have been found to be satisfactory if sufficient (but not excessive) water is used and the ground hydrate exposed or aged a sufficient period of time while exposed to this moisture, the resultant treated ground hydrate must contain the recited moisture content of at least about 0.25, yet less than 1 percent so that the ground and treated hydrate will still be a freely flowing comminuted product. This has been found to be most satisfactorily and reproducibly achieved under production conditions if, in accordance with a preferred embodiment of the invention, the treated ground hydrate is obtained by contacting the hydrate with steam at about 100°C for about 0.1 to 5.0 minutes.

The effect of the addition of water to a ground alumina particle to render it compatible with foamable latex materials is not completely understood. When finely divided alumina trihydrate is used, that is, unground alumina trihydrate, the resultant latex mixtures are found to produce satisfactory foams. However, when the identical material has been subjected to a grinding process, the resultant latex composition will not produce a satisfactory foam, that is, a foam which does not collapse within a short period of time after formation thereof. Comparison of the chemically combined water of the ground and unground alumina trihydrate shows a comparable amount of water of hydration (LOI'S substantially identical). While we do not wish to be bound by any theory of operation, it has been proposed that the freshly ground surfaces, that is, the fractured surfaces of the alumina trihydrate crystals, in some manner interfere or interact with the constituents of the latex material possibly due to a charged condition on the fractured surface. Contacting the fractured surface of the particle with water appears to in some way alter the deleterious effect of the surface on the foam rendering the ground particle compatible with the foam latex material.

The treatment of aluminum oxide or alumina with water is, of course, not new. For example, U.S. Pat. No. 1,953,201 (Tosterud) teaches the use of water with aluminum trihydrate to form an alumina hydrate having a content of combined water not exceeding that of alumina dihydrate.

Weiser et al. U.S. Pat. No. 2,406,420 teaches the addition of water to ground hydrate to enable one to form various shapes prior to firing the alumina to dehydrate or activate the alumina. The use of water and steam have also been used to dehydrate a hydrated alumina as, for example, taught in Newsome U.S. Pat. No. 2,642,337. However, there seems to be no appreciation by the art that the ground surface of a fully hydrated alumina hydrate crystal can be further treated with water to somehow change the particle or at least the surface of the particle, to render it compatible with a foamable latex composition.

It was even more surprising to find that the interaction of the water with the ground surfaces is not instantaneous but is subject to a time-temperature relationship wherein for example, the interaction of the water with the ground surfaces at room temperature may take several days whereas, at elevated temperatures, the interaction may be accomplished at a relatively short time. Thus, while the latex compositions into which the ground hydrate is added are, as is well known to those skilled in the art, usually water dispersions, the introduction of the ground alumina into such compositions apparently does not provide sufficient water contact. Thus, it was quite surprising to find that the addition of material which was already thought to be in contact with the ground alumina surface under certain controlled conditions could change the particle.

The following examples will serve to illustrate the practice of the invention.

EXAMPLE 1

About 1,000 grams of Alcoa C–30DB alumina trihydrate having an average particle size of over 74 microns was ground batchwise in a ball mill for 120 minutes to a particle size range of about 12 to 20 microns with less than about 5 percent greater than 74 microns. Different quantities of liquid water were added to the alumina trihydrate at the beginning of each batch grind. The treated ground hydrate was aged in sealed containers for varying times at 21°C as tabulated below. Each portion after treatment was formulated into a latex foam composition as follows.

A 115 gram sample of the ground alumina hydrate was mechanically stirred with 190 grams of a styrene-butadiene rubber — natural rubber latex foam mix and 17 grams of a dithiocarbamate accelerator. 250 grams of this mixture were then whipped and foamed in a mixing bowl of a Hobart Kitchen Aid Model K5-A for 75 seconds at No. 6 speed setting of the wire whip. 9 to 9½ ml of an ammonium acetate gelling agent was then added and the mixture whipped at a No. 2 speed for 15 seconds and then slowly whipped for 45 seconds at a No. 1 speed. The resultant foam was then poured into a puddle, confined by forms, and struck off to obtain a foam 6.35 millimeters deep. A stopwatch was started and a time was noted when foam collapse began as bubbles evolved from the surface of the puddle. The puddle was observed for 10 minutes in each instance before curing in an oven for 15 minutes at 121°C. When the puddle did not collapse within 10 minutes, the foam was considered to be stable, that is, not deleteriously effected by the ground hydrate. The results for each of the samples are tabulated below.

TABLE I

| Sample | Liquid H₂O Added in % of Hydrate | Aging of Treated Hydrate days at 21°C | Latex Foam Puddle |
| --- | --- | --- | --- |
| A | 0.065 | 1 | Collapse, 62 sec. |
| B | 0.065 | 8 | Stable, >600 sec. |
| C | 0.10 | 0 | Collapse, 64 sec. |
| D | 0.01 | 3 | Stable, >600 sec. |
| E | 0.12 | 0 | Stable, >600 sec. |
| F | 0.15 | 0 | Stable, >600 sec. |

It can be seen that when low quantities are used, that is, quantities below one-tenth of 1 percent, the alumina has insufficient treatment with water unless it is aged for a long period of time such as, for example, 8 days. When one-tenth of 1 percent is used, the material must age for at least 3 days while higher amounts appear to be usable without further aging.

EXAMPLE 2

Further group of samples were prepared in accordance with the procedures in Example 1. These samples were then exposed respectively to: (a) humid air at 20 percent relative humidity or 94 percent relative humidity; (b) dampened with 7 to 11 percent of moisture followed by either immediate use, aging in sealed containers at room temperature or drying at an elevated temperature; and (c) exposure to a large amount of water such as a slurry followed by drying at an elevated temperature or exposure to steam saturated at 100°C. The results are tabulated in Table II below.

the feed hydrate into the classifying air when a commerical type ball mill such as a Hardinge ball mill is used with the result that insufficient moisture is apparently deposited on the surface of the ground hydrate. It should, perhaps, be noted here that while the moisture content of the treated hydrate has been expressed in terms of the final and total content, in actual practice this is largely made up of the added moisture since unground hydrates containing appreciable amounts of

TABLE II

| Sample | H₂O Treatment of Freshly Ground Hydrate | Latex Foam Puddle |
|---|---|---|
| G | None | Collapse, 35 sec. |
| H | Exposed 13 days at 20% R.H. at 21°C | Collapse, 77 sec. |
| I | Exposed 13 days at 94% R.H. at 21°C | Stable, >600 sec. |
| J | Dampened (7-11% moisture) at 21°C | Collapse, 69 sec. |
| K | Dampened (11% moisture) at 21°C, Aged 3 days at 21°C | Stable, >600 sec. |
| L | Dampened (7-11% moisture), Dried 2 hrs. at 105°C | Stable, >600 sec. |
| M | Slurry of 50% solids, Dried 2 hrs. at 105°C | Stable, >600 sec. |
| N | Steamed (sat'd 100°C) 15 min. (14% moisture) | Stable, >600 sec. |
| O | Steamed (sat'd 100°C) 5 min. in fluid bed (6% moisture) | Stable, >600 sec. |

It will be seen that when either a high humidity is used, or a high degree of moisture followed by aging for a period of time, or a high degree of moisture plus an elevated temperature, the foams appear to be stable. Thus, in each instance in Example 2, the material must not only be subject to a certain minimum quantity of moisture but must be exposed to such moisture for a certain time-temperature relationship wherein the higher the temperature, the less time is needed for exposure.

The time-temperature relationship becomes important for commercial considerations in that only elevated temperatures can be considered to be satisfactory since long periods of time for exposure become rather impractical. It should be noted that, while the last two samples in Example 1 appear to indicate that a sufficient amount of water could sufficiently treat the ground alumina even without a long exposure time nor elevated temperature, these results were not reproducible when tried on a larger scale. The explanation for this appears to be that: liquid water evaporates from water have been found to lose water during the grinding process due to classifying air streams, frictional heat and the like.

EXAMPLE 3

To further determine the effect of time and temperature upon the treatment of the ground hydrate as well as to determine the most advantageous point of treatment, a large quantity of alumina trihydrate was processed in a large scale facility somewhat similar to that shown in FIG. 2. A Hardinge ball mill was used to grind the trihydrate. As indicated in the table below, water was added, at least in some instances, to the hydrate before entry into the ball mill. Steam was also added in some instances to the classifying air stream, and in each instance, the relative humidity of the air stream was determined as well as the moisture content of the ground hydrate after exposure to one or both of the foregoing sources of moisture. The results are tabulated in Table III below.

TABLE III

| Sample | Treatment | | | Product | |
|---|---|---|---|---|---|
| | %H₂O Added to Hydrate on Feeder | Classifying Air | | Hydrate Moisture % | Latex Foam Puddle |
| | | Stream Added | R.H. % | | |
| A* | 0.00 | None | 9 | 0.19 | Collapse, 158 sec. |
| B | 0.25 | None | 10 | 0.15 | Collapse, 77 sec. |
| C* | 0.25 | None | 14 | 0.14 | Collapse, 115 sec. |
| D | 0.54 | None | 10 | 0.20 | Collapse, 90 sec. |
| E | 0.54 | Yes | 52 | 0.19 | Collapse 170 sec. |
| F | 1.08 | Yes | 59 | 0.16 | Collapse, 140 sec. |
| G** | 1.08 | Yes | 59 | 0.16 | Collapse, 85 sec. |

* Samples A and C were aged 9 days (after treatment) at 21°C in sealed plastic bags.
** Sample G was aged 13 days (after treatment) at 21°C in a sealed plastic bag.

As can be seen from the data presented, in each instance no significant moisture was applied to the ground hydrate product and foam collapse resulted with this treated product.

EXAMPLE 4

Further amounts of hydrate were ground as in Example 3, but, in addition, saturated steam at 100°C was injected into the product screw conveyor to provide a minimum contact time of 0.4 min. The results are tabulated in Table IV.

the hydrate material with water cannot be excessive in that the product will cake and will not freely flow as a powder. Thus, it is important to only contact the hydrate with a sufficient amount of water for the purpose intended and to use as little excessive water as possible to avoid handling problems.

Thus, the invention provides for the production of stable fire-retardant foam latexes, wherein alumina trihydrate which has been ground to a proper particle size is treated with sufficient water at a sufficient temperature to prevent subsequent collapse of the foam when

TABLE IV

| Sample | Treatment | | | | Product | |
|---|---|---|---|---|---|---|
| | %H₂O Added to Hydrate on Feeder | Classifying Air | | Steam on Product Screw | Hydrate Moisture % | Latex Foam Puddle |
| | | Steam Added | R.H. % | | | |
| 1 | 0.00 | None | — | None | 0.16 | Collapse, 90 sec. |
| 2 | 0.21 | Yes | 55 | Yes | 0.43 | Stable, >600 sec. |
| 3 | 0.21 | Yes | 50 | Yes | 2.19 | Stable, >600 sec. |
| 4 | 0.00 | None | 18 | None | 0.15 | Collapse, 68 sec. |
| 5 | 0.00 | None | 14 | Yes | 0.97 | Stable, >600 sec. |
| 6 | 0.00 | None | 16 | Yes | 0.57 | Stable, >600 sec. |
| 7 | 0.00 | None | 13 | Yes | 0.25 | Semi-Stable, 225 sec. |
| 7a* | 0.00 | None | 13 | Yes | 0.25 | Stable, >600 sec. |
| 8 | 0.00 | None | 10 | Yes | 0.26 | Collapse, 165 sec. |
| 8a** | 0.00 | None | 10 | Yes | 0.26 | Stable, >600 sec. |
| 9 | 0.00 | None | 10 | Yes | 0.34 | Stable, >600 sec. |
| 10** | 0.00 | None | — | Yes | 0.45 | Stable, >600 sec. |
| 11 | 0.00 | None | 10 | Yes | 0.33 | Collapse, 100 sec. |
| 11a*** | 0.00 | None | | Yes | 0.33 | Stable, >600 sec. |
| 12 | 0.00 | None | 7 | Yes | 0.35 | Stable, >600 sec. |
| 13 | 0.00 | None | 9 | Yes | 0.35 | Stable, >600 sec. |

* Aged 10 days at 21°C in sealed plastic bag.
** Aged 9 days at 21°C in sealed plastic bag.
*** Aged 8 days at 21°C in sealed plastic bag.

The injection of saturated steam into the conveyor screw resulted in a large increase in the moisture content of the ground hydrate and in most instances, resulted in a foam which did not collapse in the time period allotted. It should be noted that Samples 7, 8, and 11 had a lower moisture content, and the resulting foams collapsed. However, when portions from each of the samples were aged in sealed containers for a period of time at 21°C, the resultant foams were stable. Apparently, a certain amount of time as well as heat is required to properly contact all of the surface areas of the fractured particles when the moisture content is marginal. When the moisture content is insufficient, but, however, marginally close, introducing the moisture even under heated conditions is not always sufficient. However, as illustrated, the situation may be remedied in such instances by a period of aging which apparently enables the moisture in the ground hydrate to diffuse to the remaining untreated surfaces.

It should again be emphasized that the treatment of the latex is mixed with the hydrate filler material.

While the invention has been described in terms of preferred embodiments, the claims appended hereto are intended to encompass all embodiments which fall within the spirit of the invention.

Having thus described the invention and certain embodiments thereof, what is claimed is:

1. A process for rendering coarse alpha alumina trihydrate particles compatible with foamable latices to produce fire-retardant products comprising a. grinding the coarse particles to a median particle size of about 6–35 microns with less than about 5 percent of said particles over 74 microns; and b. contacting the surfaces of the ground particles with liquid water at a temperature of about 20°C to about 100°C or steam at about 100°C to provide a moisture content of at least about 0.25 but less than 1 percent by total weight of the hydrate to provide a treated yet freely flowing comminuted alumina hydrate yet prevent collapse of a fire-retardant foam latex made using said trihydrate.

2. The process of claim 1 wherein said particles are contacted with steam at about 100°C for a time period of from about 0.1 to about 5 minutes to provide a moisture content in the hydrate of at least about 0.25 percent by total weight.

3. The process of claim 2 wherein said moisture content after grinding and contacting with steam is from about 0.25 to about 0.5 percent by total weight.

4. The process of claim 2 wherein said contact time is at least about 0.4 minutes.

5. Finely divided ground alpha alumina trihydrate particles compatible with foamable latices to produce fire-resistant compositions ground to a median particle size of about 6–35 microns with less than about 5 percent of the particles over 74 microns and treated with water at 20°C to 100°C or steam at 100°C to provide a moisture content of at least 0.25 percent but less than 1 percent by total weight.

6. A ground alumina-trihydrate treated with an aqueous material consisting of water at 20°C to 100°C at 100°C subsequent to grinding to render it compatible with foamable latices including: a curable latex, an accelerator; and a gelling agent, said ground alumina-trihydrate comprising finely divided particles having a median particle size of about 6–35 microns with less than about 5 percent of the particles over 74 microns.

7. The composition of claim 4 wherein said ground alumina-trihydrate particles have a moisture content of at least 0.25 percent but less than about 1 percent by total weight.

* * * * *

UNITED STATES PATENT OFFICE
CERTIFICATE OF CORRECTION

PATENT NO. : 3,874,889
DATED : April 1, 1975
INVENTOR(S) : G. A. Geppert and R. D. Woosley It is certified that error appears in the above-identified patent and that said Letters Patent are hereby corrected as shown below:

| Patent Location | Correction |
|---|---|
| Col. 1, line 24 | After "imparts" delete "the" (second occurrence). |
| Col. 4, Table I | Under the column heading "Liquid $H_2O$ Added in % of Hydrate" change "0.01" in Row D to --0.10--. |
| Col. 6, Table III | Under the column heading "Classifying Air" change "Stream" to --Steam--. |
| Col. 7, Table IV | Under the column heading "R.H. %" insert --10-- in Row 11a***. |
| Col. 10, line 5 (line 2 of Claim 6) | After "100°C" insert --or steam--. |
| Col. 10, line 12 (line 1 of Claim 7) | Change "4" to --6--. |

Signed and Sealed this twenty-third Day of September 1975

[SEAL]

Attest:

RUTH C. MASON
*Attesting Officer*

C. MARSHALL DANN
*Commissioner of Patents and Trademarks*